(12) United States Patent
Ayichew et al.

(10) Patent No.: US 9,577,850 B2
(45) Date of Patent: Feb. 21, 2017

(54) CONTROL ACTUATION SMOOTHING

(71) Applicant: Goodrich Corporation, Charlotte, NC (US)

(72) Inventors: Efrem E. Ayichew, Troy, OH (US); Michael Abbott, Shelburne, VT (US)

(73) Assignee: GOODRICH CORPORATION, Charlotte, NC (US)

( * ) Notice: Subject to any disclaimer, the term of this patent is extended or adjusted under 35 U.S.C. 154(b) by 53 days.

(21) Appl. No.: 14/532,617

(22) Filed: Nov. 4, 2014

(65) Prior Publication Data

US 2016/0020928 A1    Jan. 21, 2016

Related U.S. Application Data

(60) Provisional application No. 62/026,471, filed on Jul. 18, 2014.

(51) Int. Cl.
| | |
|---|---|
| *B64C 25/42* | (2006.01) |
| *H04L 25/03* | (2006.01) |
| *B64C 25/46* | (2006.01) |
| *B64C 25/44* | (2006.01) |
| *B60T 8/17* | (2006.01) |
| *B60T 13/74* | (2006.01) |

(52) U.S. Cl.
CPC ....... *H04L 25/03261* (2013.01); *B60T 8/1703* (2013.01); *B60T 13/741* (2013.01); *B64C 25/42* (2013.01); *B64C 25/44* (2013.01); *B64C 25/46* (2013.01)

(58) Field of Classification Search
CPC ........... B64C 25/42; B64C 25/44; B64C 25/46
USPC ................... 701/70; 303/9.75, 188; 244/111
See application file for complete search history.

(56) References Cited

U.S. PATENT DOCUMENTS

| | | | | |
|---|---|---|---|---|
| 8,666,625 B1 * | 3/2014 | Georgin | ............... | B60T 8/1703 701/70 |
| 2003/0025035 A1 * | 2/2003 | Park | ....................... | B64C 25/46 244/111 |
| 2005/0269872 A1 * | 12/2005 | Ralea | ....................... | B60T 8/00 303/20 |
| 2007/0132311 A1 * | 6/2007 | Giazotto | ............... | B60T 8/1703 303/126 |
| 2007/0284939 A1 * | 12/2007 | Charles | ..................... | B60T 1/10 303/152 |
| 2008/0154470 A1 * | 6/2008 | Goranson | ............... | B60T 7/042 701/70 |
| 2008/0258014 A1 * | 10/2008 | McCoskey | ................ | B60L 7/10 244/221 |
| 2011/0226569 A1 * | 9/2011 | Devlieg | ................ | B60T 8/1703 188/158 |

(Continued)

FOREIGN PATENT DOCUMENTS

EP          2017149          1/2009

OTHER PUBLICATIONS

Extended European Search Report dated Nov. 23, 2015 in European Application No. 15177223.3.

*Primary Examiner* — Thomas G Black
*Assistant Examiner* — Wae Louie
(74) *Attorney, Agent, or Firm* — Snell & Wilmer, L.L.P.

(57) ABSTRACT

The present disclosure relates to control actuation smoothing, and more particularly, to a control actuation smoothing system that smoothes brake actuation. The smoothing may be determined in response to a filter. In various embodiments, the smoothing may enhance brake component performance.

15 Claims, 5 Drawing Sheets

(56) References Cited

U.S. PATENT DOCUMENTS

| | | | |
|---|---|---|---|
| 2012/0143392 A1* | 6/2012 | Lurie | B64C 13/04 701/1 |
| 2012/0261980 A1* | 10/2012 | Hurst | B64C 25/44 303/9.75 |
| 2014/0156160 A1* | 6/2014 | DeVlieg | B60T 8/00 701/70 |
| 2016/0020928 A1* | 1/2016 | Ayichew | B64C 25/42 701/70 |

* cited by examiner

CONTROL ACTUATION SMOOTHING

CROSS REFERENCE TO RELATED APPLICATIONS

This application claims priority to and is a non-provisional of U.S. Provisional Patent Application Ser. No. 62/026,471, filed Jul. 18, 2014, and entitled "Control Actuation Smoothing," which is incorporated by reference herein in its entirety.

FIELD

The present disclosure relates to filters, and more particularly, to a filtering system that smoothes control actuation.

BACKGROUND

Aircraft brake control systems receive input signal(s) indicating the desired actuator braking force/desired brake torque and transmit an output signal to a brake actuator. The output signal may direct a brake actuator to actuate according to a path of actuator travel that the mechanical components of the brake actuator are unable to accomplish. Thus, there may be an error between the desired brake actuator position, rate, and/or rate change and the actual brake actuator position, rate, and/or rate change. This error may cause mechanical components of the brake actuator to move frequently, for example, during fine adjustments caused by quantization noise, and/or to experience high loads due to the difference between the actual behavior of the mechanical actuator components and the desired behavior indicated by the output signal. This error may increase component wear.

SUMMARY

A method of control actuation smoothing. The method may include receiving, by an aircraft brake and steering controller ("ABSC") having a processor and a non-transitory memory, target performance data, receiving, by the ABSC, a force command including a braking actuation instruction, and comparing, by the ABSC, the force command to an expected brake behavior. The method may include determining, by the ABSC, an error between the force command and the expected brake behavior, filtering, by the ABSC, the force command in response to the error, and outputting, by the ABSC, a smoothed force command in response to the filtering.

A control actuation smoothing system is disclosed. A control actuation smoothing system may include a filter, a target performance data input having a logical input in communication with target performance data and the filter and a control data input having a logical output in logical communication with a control data source and the filter, whereby a force command may be received by the filter. The system may also include a smoothed force command output including a logical output in communication with the filter and an electric brake controller, whereby a smoothed force command may be output by the filter.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
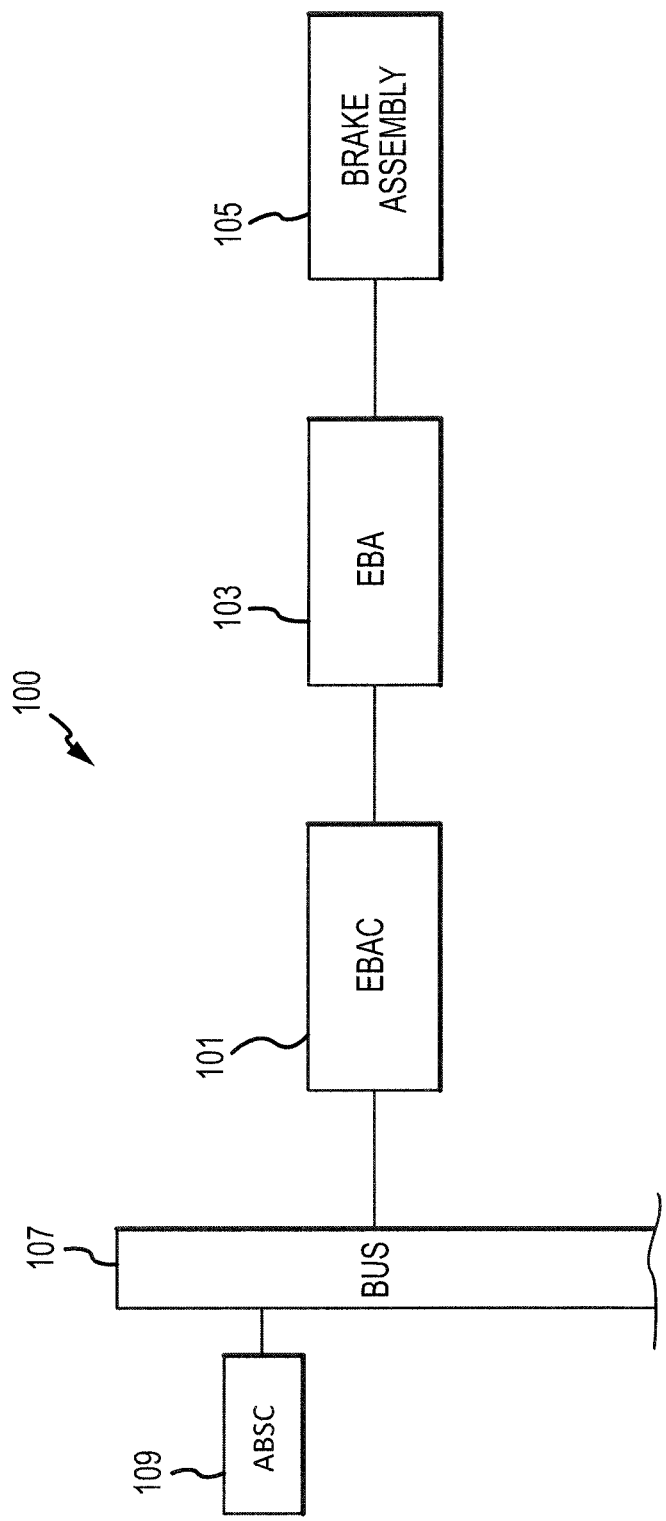
FIG. 1 depicts an example aircraft braking system wherein a control actuation smoothing system may be implemented in accordance with various embodiments.

The present disclosure relates to a brake control system, such as an aircraft brake control system. With reference to FIG. 1, a brake control system 100 may have an electrical brake actuation controller 101 ("EBAC"), an electric brake actuator 103 ("EBA"), and a brake assembly 105. The EBAC 101 may provide force commands to the EBA 103 directing the EBA 103 to cause the brake assembly 105 to mechanically operate, moving the aircraft brakes. For example, the EBAC 101 may be responsible for executing brake actuation instructions received via a logical connection, such as a controller area network ("CAN") bus 107, from other aircraft systems, such as an aircraft brake and steering controller 109 ("ABSC"). In this manner, the brakes may be operated. In further embodiments, the EBAC 101 may provide force commands to more than one EBA 103, for example, a first EBA and a second EBA, or any number of EBAs, in order to operate more than one brake assembly, for example, a first brake assembly and a second brake assembly in concert.

The force commands and brake actuation instructions may comprise signals from various different sources. For example, the force command and/or brake actuation instructions may be an interpretation of the pilot's brake pedal application. The force command and/or brake actuation instructions may be an interpretation of manual and/or auto-brake instructions corresponding to a desired aircraft deceleration rate. Furthermore, noise, such as small and/or inadvertent brake pedal movements may be present.

During a braking event, the ABSC may superimpose a brake release command on top of the force command and/or brake actuation instructions. The brake release command may free up a locked and/or skidding wheel. For example, an anti-skid and/or anti-lock brake command may be superimposed.

However, the brake release command (such as an antiskid and/or anti-lock brake command) may be updated at a different rate than the other force command and/or brake actuation instructions, such as a pilot braking command. It may be desired that the aircraft brakes respond very rapidly to anti-skid and/or anti-lock brake commands. Thus, it may be desired that the brake actuation state be updated very frequently. However, it may be desired that the aircraft brakes respond less rapidly during normal operation. Thus, it may be desired that the brake actuation state be updated less frequently during normal operation than during antiskid and/or anti-lock operations. For instance, by responding less rapidly during normal operations, the service life of the aircraft brakes may be enhanced. In order to ameliorate the wear experienced by the brake assembly 105 during mechanical movements of the brakes, the brake actuation state of the aircraft brakes may be less frequently updated during normal operation. As such, there may be a need for a control actuation smoothing system 200 wherein various different filters can be applied depending on the nature and rate of the brake actuation instructions and/or brake release command.

For instance, a ABSC 109 may update the brake actuation instructions at an about 1000 Hz, but may only transmit the most recent command (e.g., force command) to the EBAC 101 at an about 25 Hz. Thus, under normal operations, some brake actuation instructions are never transmitted as force commands. However, when an anti-skid/anti-lock brake command is superimposed, the ABSC 109 may transmit the most recent instructions as force commands to the EBAC 101 at the full update rate of about 1000 Hz. Thus, during anti-skid/anti-lock operations, more frequent transmission of force commands causes the brake actuation status to be updated more frequently, and thus the aircraft brakes to move more frequently.

In various embodiments, the ABSC 109 may transmit force commands to the EBAC 101 at a fixed rate, regardless of the source of the brake actuation instruction it may receive. In further embodiments, the ABSC 109 may transmit force commands to the EBAC 101 at any rate, or a variety of rates, or a variable rate.

The force commands are received at the EBA 103 and the EBA 103 directs the brake assembly 105 to move, in response. However, because the brake assembly 105 is a physical device with mechanically articulating components, the speed, acceleration, and exerted force that the moving parts of the brake assembly 105 can achieve are limited by physical properties.

In various embodiments, the EBA 103 experiences wear in response to the difference between the EBA 103 behavior directed by the force commands and the EBA 103 behavior actually manifested due to the physical properties of the mechanically articulating components.

Thus, it is advantageous to smooth the force commands to approximate the physical capabilities of the EBA 103. Stated differently, it is advantageous to smooth the force commands so that they do not direct the EBA 103 to undertake mechanical operations that it is unable to achieve. In this manner, the mechanical wear of the EBA 103 components may be improved. Furthermore, in various embodiments, the EBA 103 may include provisions to disable the smoothing in the event that a brake release command is present, so that the locked and/or skidding wheel may be freed up more rapidly.

As discussed herein, various aspects of the present disclosure may be implemented in various logical units of a processor having a non-transitory memory. In various embodiments, various aspects may be implemented in multiple processors and/or memories. For example, the disclosed system may be implemented within the EBAC 101. Alternatively, various aspects of the disclosed system may be implemented within the EBAC 101 and/or the EBA 103 and/or ABSC 109. Thus, one may appreciate that the ABSC 109 may comprise a processor and a tangible, non-transitory memory. For example, the ABSC 109 may comprise a digital signal processor (DSP).

Figure 2:
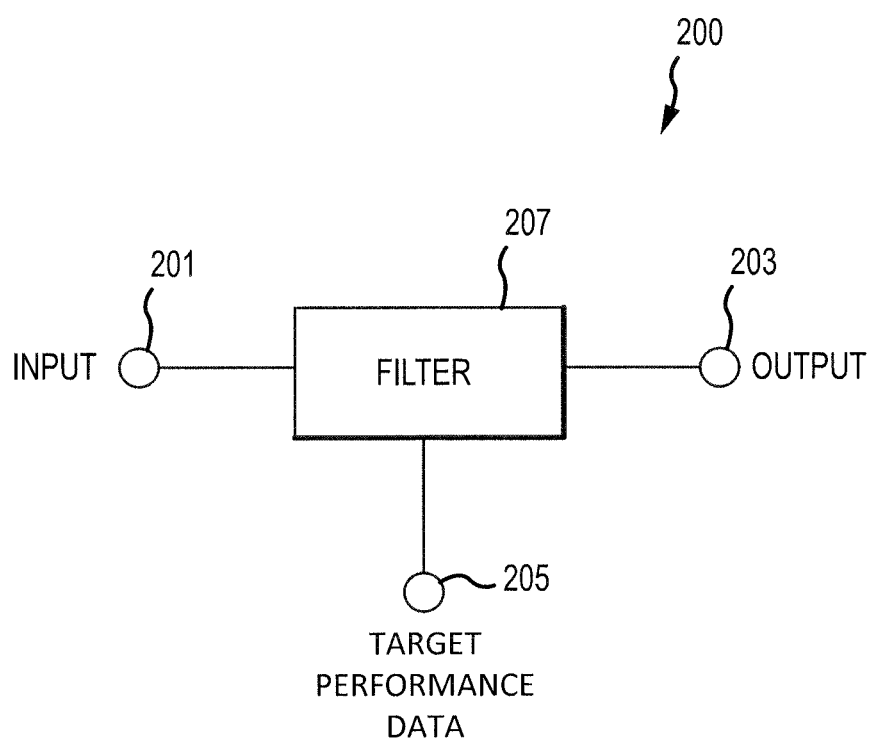
FIG. 2 depicts a block diagram overview of a control actuation smoothing system in accordance with various embodiments.

With reference to FIGS. 1 and 2, a control actuation smoothing system 200 may be implemented in order to smooth the force commands to better approximate the physical capabilities of the EBA 103 and/or brake assembly 105. For example, a control actuation smoothing system 200 may comprise a filter 207, a target performance data input 205, a control data input 201, and a smoothed force command output 203. The control data input 201 may receive brake actuation instructions, for example, from a ABSC 109 (in the event that the control actuation smoothing system 200 is implemented within the EBAC 101). The control data input 201 may receive force commands, for example, from an EBAC 101 (in the event that the control actuation smoothing system 200 is implemented within the EBA 103). Target performance data input 205 may comprise a logical input to filter 207. Target performance data may comprise historical data, for example, a previously sent smoothed force command ("precedent smoothed force command"), and/or feedback data comprising the past response of a brake assembly 105 to a past smoothed force command, or any other relevant data. For example, the target performance data may comprise brake assembly position data provided by a sensor in proximity to the brake assembly 105.

The filter 207 may receive target performance data information via target performance data input 205. This information may be provided by sensors, logical interconnections, models, and/or any other aircraft system or physical or logical device. The filter 207 may perform various operations on these inputs and may provide smoothed force commands via smoothed force command output 203. In this manner, force commands may be received at control data input 201, and may be smoothed in response to the target performance data of the brake assembly 105, then output as smoothed force commands via smoothed force command output 203.

Filter 207 may comprise a digital filter. Alternatively, filter 207 may comprise an analog filter. In further embodiments, filter 207 may comprise a combination of digital and analog filter components. In various embodiments, filter 207 comprises a first order system approximation filter. The transfer function of the filter may approximate the transfer function of the brake plant (e.g., the brake assembly 105 and/or the EBA 103). Moreover, filter 207 may comprise different switchable filter components that may be selectable based on desired smoothed force command behavior. In various embodiments, the filter operates to decrease the error in the response of the EBA 103 and/or brake assembly 105 as compared to the intended response of the EBA 103 and/or brake assembly 105 directed by the brake control instructions. Accordingly, the filter may receive sensed data, for example, EBA 103 position data, whereby the filter may actively adapt to better compensate for mechanical and physical properties over time. Moreover, in various embodiments, various different filter architectures may be implemented. For example, filter 207 may comprise a linear approximation filter, and/or may comprise a physical response model of the EBA 103, and/or may execute statistical approximations based on historical brake actuation.

In various embodiments, filter 207 may comprise a first order system approximation filter. In other words, it may comprise a first order approximation, and may approximate the behavior of the brake assembly 105 according to a transfer function. Filter 207 may comprise different transfer functions depending on the clock speed of one or more processors, for example, a digital signal processor, comprising the filter 207. In various embodiments, the filter transfer function is approximately the same as the plant transfer function (e.g., the transfer function of the EBA 103 and/or brake assembly 105).

In various embodiments, the components comprising FIG. 1, for example, the ABSC 109, the EBAC 101, and or the EBA 103, may have a bandwidth higher than, or equal to the frequency of the brake actuation instructions and/or force commands. Moreover, in various embodiments, the brake actuation instructions are processed synchronously, although in further embodiments, they may be processed asynchronously.

Figure 3:
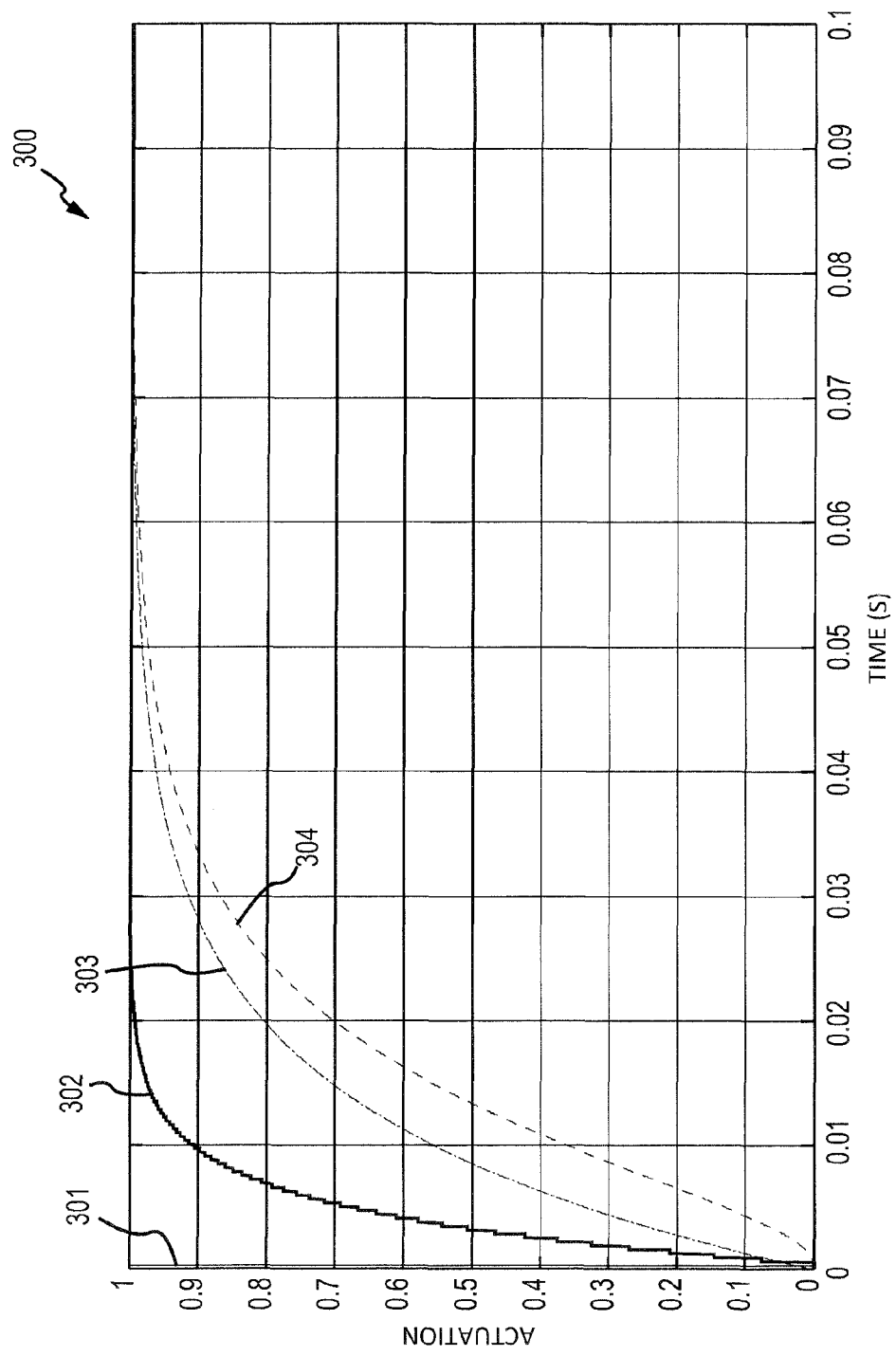
FIGS. 3-4 depict diagrams of various behaviors of control actuation smoothing systems in response to various inputs, according to various embodiments.

With reference to FIGS. 1-3, the behavior of a filter 207 comprising a first order system approximation filter is illustrated in a graph 300. A brake actuation instruction 301 may comprise an approximate step function, for instance an approximately instantaneous full brake application, for instance, a full brake application during a takeoff roll. A brake assembly 105 is unable to instantaneously change position due to the finite available instantaneous energy, and other physical limitations. For example, in response to a brake actuation instruction 301, brake assembly 105 may translate according to a brake actuation path 302 comprising a brake assembly response to the brake actuation instruction 301. However, a filter 207 comprising a first order system approximation filter may be implemented in the EBAC 101. The filter 207 may smooth the brake actuation instruction 301 to obtain a smoothed brake actuation instruction 303. A smoothed brake actuation instruction 303 may comprise a first order approximation. The brake assembly 105 may translate according to a resulting brake actuation path 304. Thus, one may appreciate that the error between the desired behavior indicated by the brake actuation instruction 301 and the brake actuation path 302 is greater than the error between the smoothed brake actuation instruction 303 and the resulting brake actuation path 304. One may also appreciate that the error between the desired behavior indicated by the brake actuation instruction 301 and the brake actuation path 302 may cease to be greater than the error between the smoothed brake actuation instruction 303 and the resulting brake actuation path 304 when a steady state limit is reached. In various embodiments, a filter 207 may consider historical error between the smoothed brake actuation instruction 303 and the resulting brake actuation path 304 and further revise the smoothed brake actuation instruction 303 produced in response to a brake actuation instruction 301. Moreover, a filter 207 may also revise the smoothed brake actuation instruction 303 in response to a brake actuation path 304 (whether per historical data or per feedback), for instance, permitting a greater error in the event of an emergency brake actuation if allowing such greater error will enable a greater braking force, regardless of potentially increased brake wear. In this manner, the filter 207 may adapt to provide various different brake behaviors in response to the target performance data input 205, the brake actuation instruction and/or force commands present at control data input 201, and/or feedback, including precedent smoothed force commands and precedent force commands.

Figure 4:
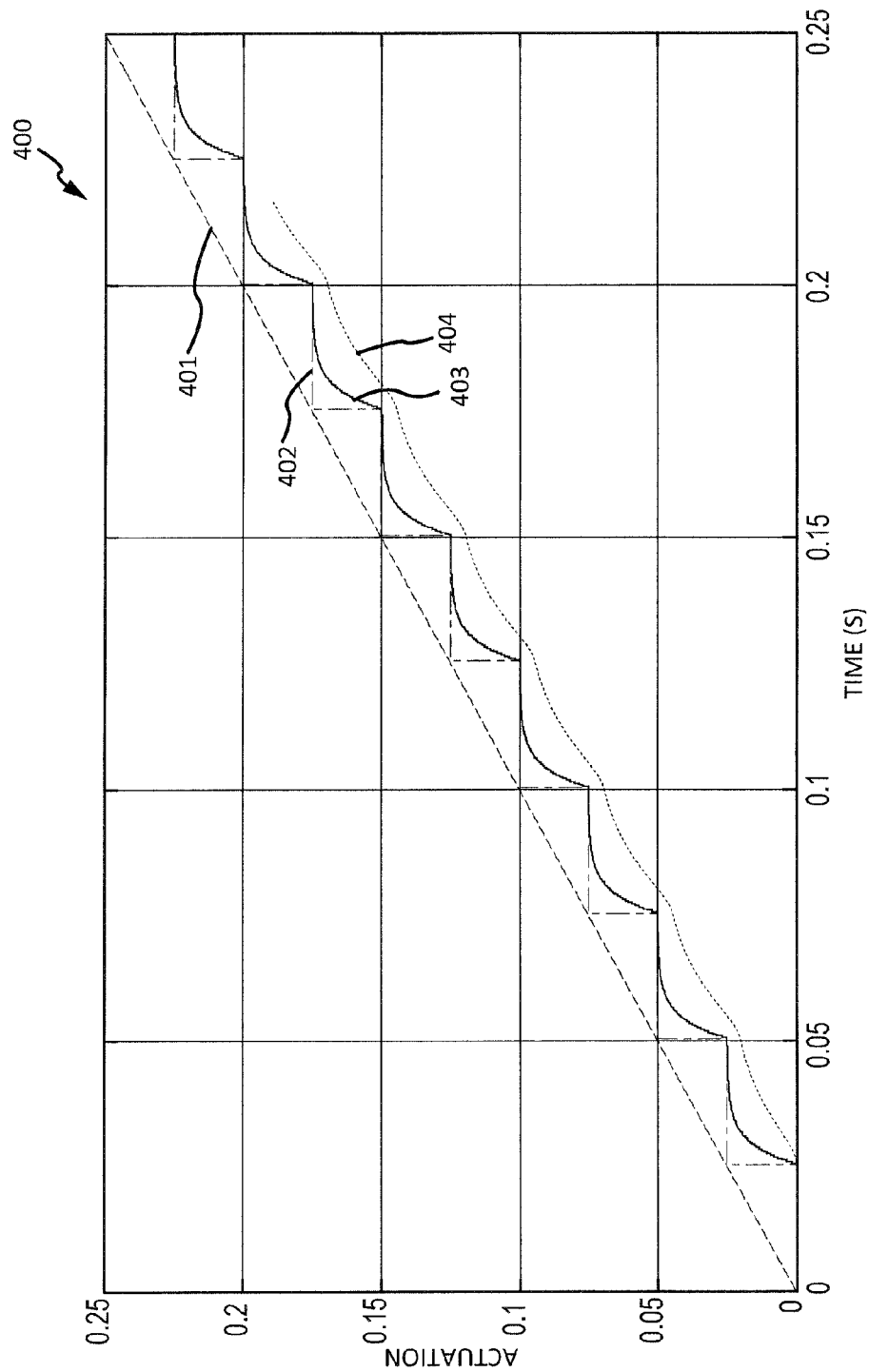
Figure 5:
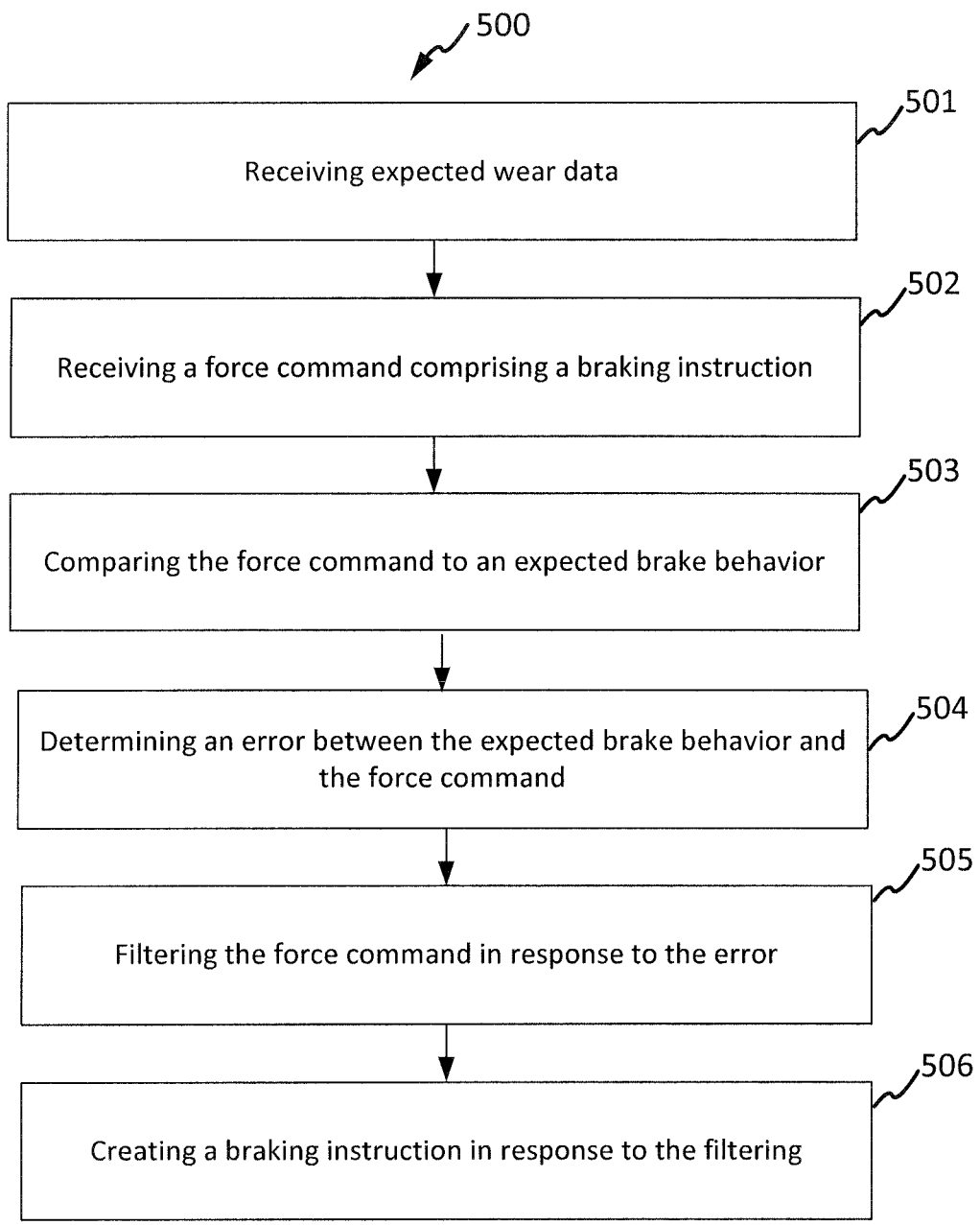
FIG. 5 depicts a flowchart illustrating a method of control actuation smoothing, according to various embodiments.

With reference to FIGS. 1-2, and 4, the behavior of a filter 207 comprising a first order system approximation filter is illustrated in a graph 400. An expected brake actuation path 401 may comprise an approximately linear function, but the brake actuation instruction 402 produced may exhibit stepwise artifacts, for example, as a result of digitization and/or quantization errors. A brake assembly 105 may be desired to operate linearly, generally along the expected brake actuation path 401, but due to the step-wise artifacts may "dither," (e.g., operate in a rapid step-wise manner, so that the brake actuation instruction 402 are non-linear, rather than operating smoothly) and unwanted noise, wear, and/or brake heating may occur. Because the mechanical parts of the brake assembly 105 are unable to instantaneously change position due to the finite available instantaneous energy, and other physical limitations, in response to a brake actuation instruction 402, a brake assembly 105 may translate according to a brake actuation path 403 comprising a brake assembly response to the brake actuation instruction 402. However, a filter 207 comprising a first order system approximation filter may be implemented in the EBA 103. The filter 207 may smooth the brake actuation instruction 402 to approximate the brake system actuation, thus, the brake assembly 105 may translate according to a resulting brake actuation path 404. Thus, one may appreciate that the linearity of response is enhanced. In various embodiments, a filter 207 may further consider historical error between the brake actuation path 403 that would occur without filtering, and the resulting brake actuation path 404 that occurs with filtering. Moreover, a filter 207 may also revise the brake actuation path 403 (whether per historical data or per feedback), for instance, permitting a greater error in the event of an emergency brake actuation, or during slow speed operation. In this manner, the filter may allow greater error, regardless of potentially increased brake wear during emergency brake actuation. The filter may allow greater error in the event that enhanced linearity is prioritized over error cancellation, for instance, at very slow speeds wherein the difference between the coefficients of static friction and kinetic friction within brake assembly 105 may otherwise result in rough ground handling of the vehicle. In this manner, the filter 207 may adapt to provide various different brake behaviors in response to the target performance data input 205, the brake actuation instruction and/or force commands present at control data input 201, and/or feedback. For further example, the filter may adapt to dampen potentially oscillatory behavior with consideration for vehicle resonance.

A control actuation smoothing system 200 may operate according to various methods. For example, a method 500 of control actuation smoothing may include receiving, by filter 207, target performance data (Step 501). The target performance data may be input via target performance data input 205. The filter 207 may also receive a force command comprising a braking instruction (Step 502). In various embodiments, the filter 207 compares the force command to an expected brake behavior (Step 503). An error is determined between the expected brake behavior and the force command (Step 504) and the force command is filtered in response to the error (Step 505). Finally, a braking instruction is created in response to the filtering (Step 506).

In this manner, the braking instruction is crafted to achieve desired wear and performance characteristics. The target performance data may be a force command and/or smoothed force command received earlier in time, or brake assembly position data, or any desired data. With reference to FIG. 3, in various embodiments, the braking instruction comprises an approximate step function, and the smoothed brake instruction comprises a first-order approximation having one point of inflection. Moreover, in further embodiments, the filtering may comprise removing dithering from the braking instruction. Furthermore, the first order approximation (e.g., transfer function) can be reshaped based on target performance data, expected brake system response and safety aspects of filtering command signals, such as refraining from filtering anti-skid/anti-lock braking signals.

In various embodiments, while the control actuation smoothing systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, in which control actuation smoothing is desirable, for example, automobile braking systems.

Tangible non-transitory memory as used herein may include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

As used herein, the meaning of the term "non-transitory computer-readable medium" should be construed to exclude only those types of transitory computer-readable media which were found in *In re Nuijten,* 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of control actuation smoothing comprising:
receiving, by an aircraft brake and steering controller ("ABSC") comprising a processor and a non-transitory memory, target performance data;
receiving, by the ABSC, a force command comprising a braking instruction;
comparing, by the ABSC, the force command to an expected brake behavior;
determining, by the ABSC, an error between the force command and the expected brake behavior;
filtering, by the ABSC, the force command in response to the error and target performance data;
outputting, by the ABSC, a smoothed force command in response to the filtering; and
translating, by the ABSC and via an electric brake actuator, a brake assembly based on the smoothed force command, the translating the brake assembly occurring after the outputting the smoothed force command.

2. The method according to claim 1, wherein the target performance data comprises a precedent force command.

3. The method according to claim 2, wherein the precedent force command comprises a smoothed brake instruction output by the ABSC earlier in time than the force command.

4. The method according to claim 1, wherein the target performance data comprises brake assembly position data.

5. The method according to claim 1, wherein the braking instruction comprises an approximate step function, and wherein the smoothed force command comprises a first-order approximation.

6. The method according to claim 5, wherein filtering comprises reshaping the first-order approximation based on at least one of: target performance data, expected brake system response, and safety aspects.

7. A control actuation smoothing system comprising:
a filter;
a target performance data input comprising a logical input in communication with target performance data and the filter;
a control data input comprising a logical input in logical communication with a control data source and the filter, whereby a force command may be received by the filter;
a smoothed force command output comprising a logical output in communication with the filter and an electric brake actuator, whereby a smoothed force command may be output by the filter,
wherein the filter is configured to determine the smoothed force command by comparing the force command with an expected brake behavior, determining an error between the force command and the expected brake behavior, and filtering the force command in response to the error and the target performance data; and
a brake assembly configured to translate after receiving the smoothed force command output, and configured to translate based on the smoothed force command output.

8. The control actuation smoothing system of claim 7, wherein the filter comprises a first order approximation filter.

9. The control actuation smoothing system of claim 7, wherein the target performance data comprises at least one precedent smoothed force command.

10. The control actuation smoothing system of claim 9, wherein the precedent smoothed force command is output by an ABSC earlier in time than the force command.

11. The control actuation smoothing system of claim 7, wherein the target performance data comprises at least one precedent force command.

12. The control actuation smoothing system of claim 7, wherein the filter comprises a digital signal processor.

13. The control actuation smoothing system of claim 7, wherein the control data source comprises an electric brake actuator controller.

14. The control actuation smoothing system of claim 7, wherein the control data source comprises a controller area network bus disposed in logical communication with an electric brake actuator controller.

15. The control actuation smoothing system of claim 7, further comprising a second electric brake actuator in logical communication with the smoothed force command output.

* * * * *